Sept. 11, 1934.    E. W. DEUSE    1,972,920
COMBINED TOOL
Filed Oct. 6, 1933
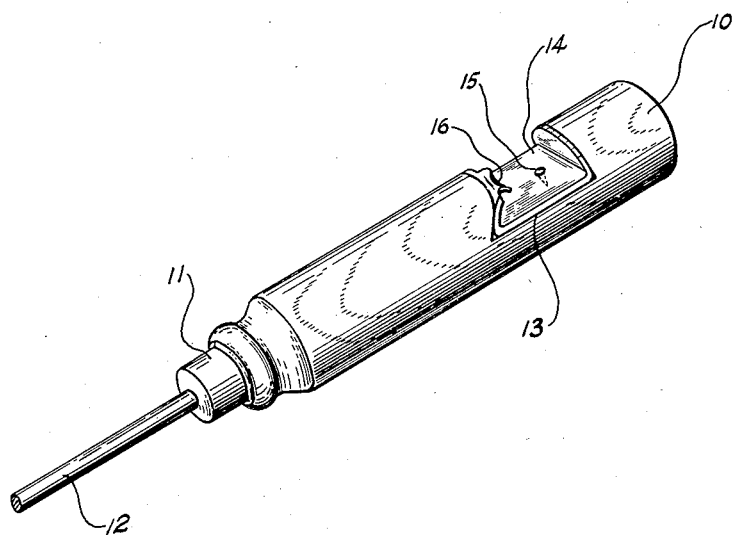
INVENTOR
*E.W.Deuse.*
BY *Joseph K. Schofield*
ATTORNEY Patented Sept. 11, 1934

1,972,920

UNITED STATES PATENT OFFICE 1,972,920

COMBINED TOOL

Edison W. Deuse, Chester, Conn.

Application October 6, 1933, Serial No. 692,463

4 Claims. (Cl. 65—46)

This invention relates to a combined tool and particularly to an ice-pick provided with a bottle cap remover preferably mounted within a portion of the handle.

An object of the present invention is to provide a convenient, efficient and practical bottle cap remover or opener formed within a handle so that the handle of a tool adapted for another purpose such as an ice-pick or kitchen utensil may serve a second function.

A feature that enables me to accomplish the above named object is that a recess is formed within one side of a tool or utensil handle into which may be fitted a steel member having a bottle cap removing clip at one end.

And finally it is an object of the invention to provide a bottle opener or cap remover conveniently supported and housed within an intermediate portion of a handle that will be inexpensive, convenient, and will not interfere with the handle as a part of another tool.

With the above and other objects in view my invention includes the features of construction and operation set forth in the following specification and illustrated in the accompanying drawing.

In the accompanying drawing annexed hereto and forming a part of this specification, I have shown my invention embodied in a combined ice-pick and bottle cap remover or bottle opener but it will be understood that the invention can be otherwise embodied and that the drawing is not to be construed as defining or limiting the scope of the invention, the claims appended to this specification being relied upon for that purpose.

In the drawing the figure is a perspective view of a combined tool made according to the present invention.

In the above mentioned drawing I have shown but one embodiment of the invention which is now deemed preferable, but it is to be understood that changes and modifications may be made within the scope of the appended claims without departing from the spirit of the invention.

Briefly, and in its preferred aspect, my invention may include the following principal parts: First, a handle preferably of wood; second, a blade or other tool extending from one end; third, a transverse recess preferably of dovetailed form cut within a portion of the handle; and fourth, a stamped, bent or other form of metal piece retained within the recess within the handle and having a bottle cap removing lip upon one end portion.

Referring more in detail to the figure of the drawing I provide a handle 10 preferably of wood and shaped either round or hexagonal in cross section. At one end is a ferrule 11 of usual form and extending from that end of the handle 10 is a blade 12 or other form of tool, that shown being an ice-pick.

Cut into one side of the handle 10 intermediate its ends and preferably nearer the end opposite that from which the blade 12 extends is a dovetailed recess 13. This recess 13 extends transversely of the handle 10 and is of uniform depth. Into this recess 13 is fitted a metal piece 14 bent as shown and secured in position as by a brad or screw 15. The metal piece 14 of which the insert within recess 13 is made has a central flat portion fitting the bottom surface of the recess 13 and bent up end portions fitting the oblique end walls or dovetailed sides of the recess 13. These bent ends have their lateral edges shaped to conform generally to the cross sectional outline of the handle 10 so that the metal piece 14 forming the bottle cap remover may be housed substantially within the handle 10 so that there may not be any projecting portions.

One of the bent up end portions of the metal piece 14, preferably that adjacent the end from which the blade or tool 12 extends, is shaped with an inwardly or forwardly bent end or lip 16 forming a prong for engaging under a metal bottle cap prior to removing it from a bottle. The end or tip of this projection may be concaved slightly as shown in the figure of the drawing so that it will better fit under the bottle cap and against the surface of a bottle.

From the above it will be seen that a simple form of bottle cap remover has been provided which, without interfering in any manner with the function or convenience of a handle of conventional form for kitchen utensils, provides an additional tool. The bottle cap remover is shown applied to a conventional or common form of handle 10 for an ice pick 12. The handle 10 with the bottle opener applied thereto takes up no more room and has no projecting portions beyond the outline of the handle. The opener 16 therefore does not interfere in any manner with the use of the handle 10 when employing the ice-pick 12. Also due to the dovetail form of the recess 13 the metal piece 14 is retained in position by the undercut portions of the handle 10 adjacent the recess.

I claim:

1. As an article of manufacture, a handle having a recess therein, a metal piece housed within said recess formed within the handle intermediate its length, end portions of said metal piece engaging opposite side walls of said recess said metal piece being confined within the outline of said handle, and a lip formed adjacent one of the end portions of said metal piece forming a bottle cap remover.

2. A combined tool handle and bottle opener comprising in combination, a handle, a blade extending from one end thereof, said handle having a recess formed intermediate the ends thereof having a flat bottom surface and oblique end surfaces and a bent up metal piece secured within said recess fitting said surfaces, and a lip on one end of said metal piece forming a bottle opener.

3. A combined tool handle and bottle opener comprising in combination, a wooden handle, a blade extending from one end, said handle having a recess formed therein and a bent up metal piece secured to said handle and fitting within said recess, said metal piece having a bottle opening lip formed thereon at the end of a bent up portion, said lip being within the outline of said handle.

4. A combined tool handle and bottle opener comprising in combination, a handle, a blade extending from one end thereof, said handle having a dovetailed recess formed within and extending longitudinally of an intermediate portion of said handle, a metal piece having end portions bent up and fitting the oblique walls of said dovetailed recess and conforming to the outline of said handle, and a lip formed on the end of one said bent up portions to form a bottle cap remover.

EDISON W. DEUSE.